US007253943B2

United States Patent
Kim et al.

(10) Patent No.: US 7,253,943 B2
(45) Date of Patent: Aug. 7, 2007

(54) PHASE OPTIMIZATION APPARATUS AND METHOD FOR OBTAINING MAXIMUM EXTINCTION RATIO IN MACH-ZEHNDER INTERFEROMETER WAVELENGTH CONVERTER USING CROSS PHASE MODULATION OF SEMICONDUCTOR OPTICAL AMPLIFIER

(75) Inventors: Joo-youp Kim, Gyeonggi-do (KR); Sang-Kook Han, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 154 days.

(21) Appl. No.: 10/933,481

(22) Filed: Sep. 3, 2004

(65) Prior Publication Data

US 2005/0100281 A1    May 12, 2005

(30) Foreign Application Priority Data

Sep. 5, 2003    (KR)    ...................... 10-2003-0062174

(51) Int. Cl.
G02F 1/035    (2006.01)
G02F 1/35    (2006.01)
G02F 1/365    (2006.01)

(52) U.S. Cl. ........................... 359/326; 359/332; 385/3

(58) Field of Classification Search .................... 385/3; 389/150, 188; 359/279, 338, 326–332
See application file for complete search history.

(56) References Cited

U.S. PATENT DOCUMENTS

| 5,307,196 | A  | * | 4/1994  | Kinoshita ................... 398/202 |
| 6,201,632 | B1 | * | 3/2001  | Rollins ....................... 359/259 |
| 6,337,762 | B1 | * | 1/2002  | Ueno .......................... 359/332 |
| 6,813,069 | B2 | * | 11/2004 | Rice et al. ................... 359/349 |
| 2004/0001247 | A1 | * | 1/2004 | Nojima ....................... 359/326 |

FOREIGN PATENT DOCUMENTS

| JP | 2002-077051   | 3/2002 |
| JP | 2002-204210   | 7/2002 |
| JP | 2003-177362   | 6/2003 |
| KR |    00237871 B1 | 10/1999 |
| KR |    000011337 A |  2/2000 |

* cited by examiner

*Primary Examiner*—Michelle R. Connelly-Cushwa
(74) *Attorney, Agent, or Firm*—Volentine & Whitt, PLLC

(57) ABSTRACT

A phase optimization apparatus and method to obtain a maximum extinction ratio by feeding back a portion of an optical signal output from a Mach-Zehnder interferometer wavelength converter using XPM of a semiconductor optical amplifier to maintain an optimum phase difference between two arms. The phase optimization apparatus includes a first arm having a first semiconductor optical amplifier that amplifies a pump signal and a probe signal, a second arm having a second semiconductor optical amplifier that amplifies the probe signal, and a π phase shifter that controls the phase of the amplified signal, an optical band-pass filter that filters optical signals to output only the modulated probe signal; and a phase control unit that receives feedback to output to the π phase shifter of the second arm a phase control signal, which controls a phase difference between the first and second arms.

24 Claims, 11 Drawing Sheets

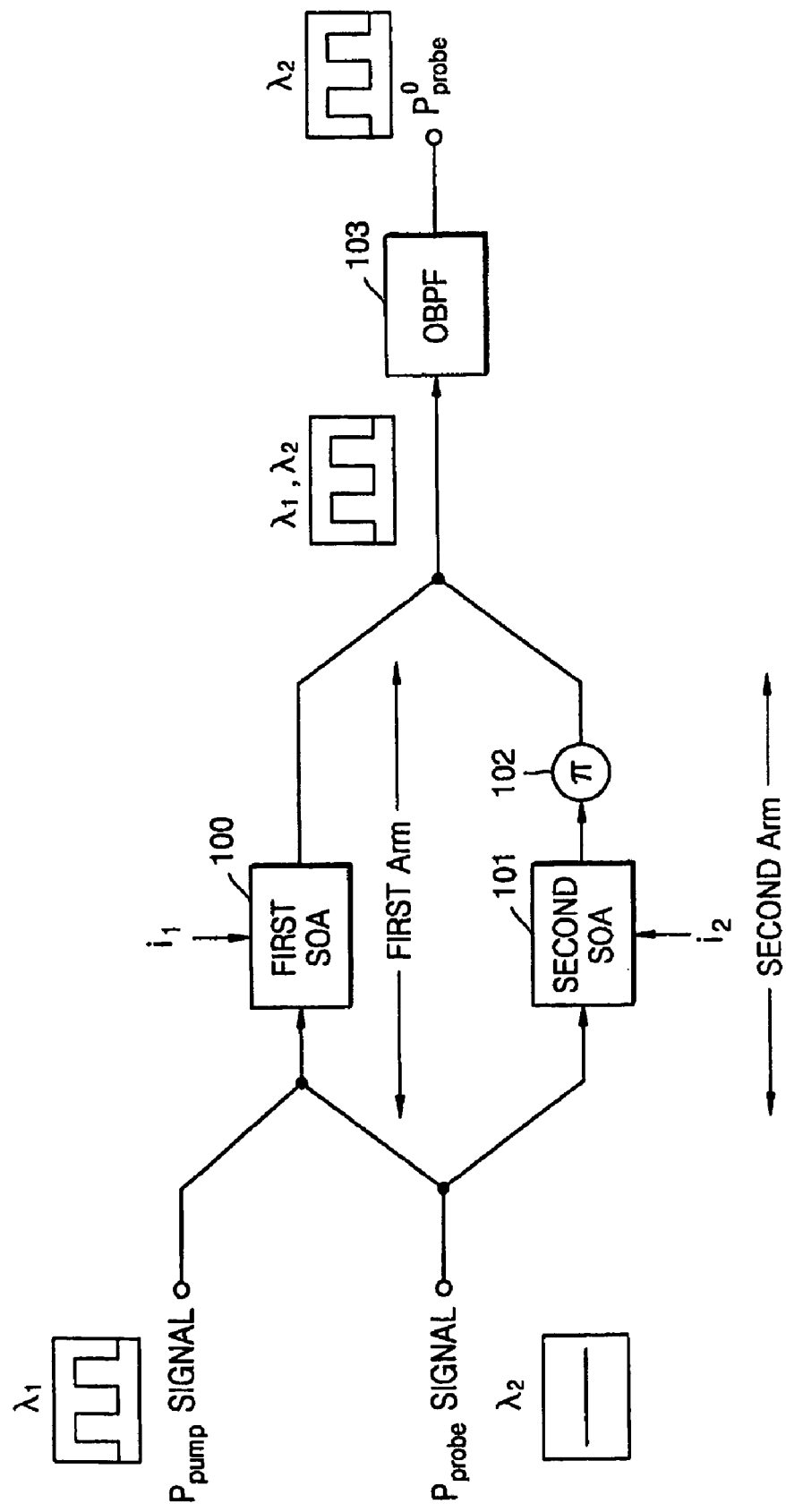

PHASE OPTIMIZATION APPARATUS AND METHOD FOR OBTAINING MAXIMUM EXTINCTION RATIO IN MACH-ZEHNDER INTERFEROMETER WAVELENGTH CONVERTER USING CROSS PHASE MODULATION OF SEMICONDUCTOR OPTICAL AMPLIFIER

CROSS-REFERENCE TO RELATED APPLICATIONS

This application claims the priority of Korean Patent Application No. 2003-62174, filed on Sep. 5, 2003, in the Korean Intellectual Property Office, the disclosure of which is incorporated herein in its entirety by reference.

BACKGROUND OF THE INVENTION

1. Field of the Invention

The present invention relates to an apparatus and method for operating a wavelength converter. More particularly, the invention relates to an apparatus and method to obtain a maximum extinction ratio by feeding back a portion of an optical signal output from a Mach-Zehnder interferometer wavelength converter using cross phase modulation (XPM) of a semiconductor optical amplifier to maintain an optimum phase difference between both arms.

2. Description of the Related Art

In order to increase a capacity and transmission speed of a communication network, efficiently operate the communication network, and improve the reliability of the network, communication environments are varied in a manner that individual networks are integrated into an integrated network. This requires large-capacity information superhighways.

A wavelength division multiplexing (WDM) technique using all-optical wavelength conversion, one type of communication infra-technology to meet the aforementioned requirement, may improve a transmission capacity of a communication network. Also, this technique enables the construction of a variable network because it uses wavelengths as routing information. In a WDM network, data is transmitted to nodes through wavelength paths that are determined by wavelengths used. However, an information connection between networks that use different wavelengths, or the number of wavelengths that may be used for each channel in the network, is limited. Accordingly, wavelength collision occurs when different channels use the same wavelength, and the designation of a path for each wavelength and effective routing become difficult, which may cause problems in the network system.

To effectively operate the WDM all-optical network, optical cross connection is required for each node. The optical cross connection is accomplished through an optical cross connection (OXC) technique. The OXC is performed by a wavelength converter that converts wavelengths, a space switch that routes a wavelength path, an optical add drop multiplexer (OADM) that drops or adds the path of an input/output optical signal at a node, and a MUX/DEMUX that combines or distributes signals with different wavelengths. The wavelength converter is the core element that implements the OXC in the WDM network. Wavelength conversion is a technique that transmits data, which is input with a certain wavelength, at a newly allocated wavelength. The wavelength conversion technique includes cross-gain modulation (XGM), cross-phase modulation (XPM), and 4 wave-mixing (FWM), that use non-linearity of a semiconductor optical amplifier.

FIG. 1 is a block diagram of a conventional XPM wavelength converter that employs a Mach-Zehnder interferometer type semiconductor optical amplifier. The XPM wavelength converter includes a first semiconductor optical amplifier 100, a second semiconductor optical amplifier 101, a π phase shifter 102, and an optical band-pass filter 103.

In a semiconductor optical amplifier, when a small signal is applied to a semiconductor active layer while the active layer is in a density-inverted state due to current injection, a signal that is amplified by stimulated emission caused by free electrons of a conduction band combining with holes of a valence band is output as photons.

The first semiconductor optical amplifier 100 amplifies a pump signal $P_{pump}$ and a probe signal $P_{probe}$ according to a current $i_1$ and phase-shifts the signals by XPM. Here, the pump signal $P_{pump}$ is a modulated optical pulse signal having a wavelength $\lambda 1$, as shown in FIG. 2A, and the probe signal $P_{probe}$ is a continuous wave optical signal having a wavelength $\lambda 2$, as shown in FIG. 2B. The part of the conventional XPM wavelength converter of FIG. 1 that amplifies the pump signal and probe signal by the first semiconductor optical amplifier 100 is designated as a first arm.

The second semiconductor optical amplifier 101 amplifies the probe signal according to a current $i_2$. The π phase shifter 102 phase-shifts the signal amplified by the second semiconductor optical amplifier 101. The part of the conventional XPM wavelength converter of FIG. 1 that amplifies the probe signal through the second semiconductor optical amplifier 101 and phase-shifts the amplified signal using the π phase shifter 102 is designated as a second arm.

Here, the π phase shifter 102 creates a phase difference of π radians between the first and second arms to improve an extinction ratio. The optical band-pass filter 103 cuts off the pump signal and outputs only the probe signal.

FIG. 3 illustrates waveforms of probe output signals of the optical band-pass filter 103 for two different phase shifts of the π phase shifter 102. In FIG. 3, (a) is a probe output signal when the phase difference between the first and second arms is zero and (b) is a probe output signal when the phase different is π.

In the Mach-Zehnder interferometer (MZI) structure, the phase of the second arm is retarded by π from the phase of the first arm due to the π phase shifter 102. The first semiconductor optical amplifier 100 has no phase delay at a low pump power, but has a phase delay of π due to XPM at a high pump power. Accordingly, the phase difference between the first and second arms is π at a low pump power and zero at a high pump power in the MZI structure. A probe power is subjected to interference due to the phase difference so that the probe signal and pump signal are modulated in the same manner. That is, constructive interference occurs when the phase difference between the first and second arms is 2nπ, and destructive interference occurs when (2n+1)π, where n=0, 1, 2, 3, . . . . According to the interference, the signal having a wavelength of $\lambda 1$ is converted into a signal having a wavelength of $\lambda 2$, to generate an output signal $P°_{probe}$ shown in FIG. 2C.

The conventional XPM wavelength converter employing a Mach-Zehnder interferometer semiconductor optical amplifier outputs a non-inverted signal with a high extinction ratio. However, the XPM wavelength converter may maintain the high extinction ratio only when the phase difference between the first and second arms is (2n+1)π at a low pump power and 2nπ at a high pump power. For this, the π phase shifter 102 is manually adjusted to set the phase difference accurately. Furthermore, the phase difference must be stabilized because it is very sensitive to the external environment.

SUMMARY OF THE INVENTION

The present invention provides a phase optimization apparatus and method to obtain a maximum extinction ratio by feeding back a portion of an optical signal output from a Mach-Zehnder interferometer type wavelength converter using XPM of a semiconductor optical amplifier to maintain an optimum phase difference between two arms.

According to an aspect of the present invention, a phase optimization apparatus comprises a first arm having a first semiconductor optical amplifier that is operated with a first predetermined current and amplifies a pump signal and a probe signal; a second arm having a second semiconductor optical amplifier that is operated with a second predetermined current and amplifies the probe signal, and a π phase shifter that controls the phase of the amplified signal; an optical band-pass filter that filters optical signals output from the first and second arms, which have interfered and have been mixed with each other, to output only the probe signal that has been modulated in the same manner as the pump signal has been modulated; and a phase control unit that receives as feedback a portion of the output signal of the band-pass filter to output a phase control signal to the π phase shifter of the second arm, which controls a phase difference between the first and second arms to increase or decrease an optical power of the band-pass filter depending on the phase difference.

According to another aspect of the present invention, a phase optimization apparatus comprises a first arm having a first semiconductor optical amplifier that is operated with a first current and amplifies a pump signal and a probe signal; a second arm having a second semiconductor optical amplifier that is operated with a second current and amplifies the probe signal, and a third semiconductor optical amplifier that amplifies the output signal of the second semiconductor optical amplifier with a third current and varies the third current according to a current control signal; an optical band-pass filter that filters optical signals output from the first and second arms, which have interfered and have been mixed with each other, to output only the probe signal that has been modulated in the same manner that the pump signal has been modulated; and a phase control unit that receives as feedback a portion of the output signal of the band-pass filter to obtain a phase control signal, which controls a phase difference between the first and second arms to increase or decrease an optical power of the band-pass filter depending on the phase difference, and converts the phase control signal into the current control signal and applies it to the third semiconductor optical amplifier of the second arm.

According to another aspect of the present invention, a phase optimization apparatus comprises a first arm having a first semiconductor optical amplifier that is operated with a first current and amplifies a pump signal and a probe signal; a second arm having a second semiconductor optical amplifier that is operated with a second current, amplifies the probe signal and varies the second current according to a current control signal; an optical band-pass filter that filters optical signals output from the first and second arms, which have interfered and have been mixed with each other, to output only the probe signal that has been modulated in the same manner as the pump signal has been modulated; and a phase control unit that receives as feedback a portion of the output signal of the band-pass filter to obtain a phase control signal, which controls a phase difference between the first and second arms to increase or decrease an optical power of the band-pass filter depending on the phase difference, and converts the phase control signal into the current control signal and applies it to the second semiconductor optical amplifier of the second arm.

According to another aspect of the present invention, a phase optimization method obtains a maximum extinction ratio in a wavelength converter that includes a first arm having a first semiconductor optical amplifier that is operated with a first predetermined current and amplifies a pump signal and a probe signal, a second arm having a second semiconductor optical amplifier that is operated with a second predetermined current and amplifies the probe signal, and a π phase shifter that controls the phase of the amplified signal, and an optical band-pass filter that filters optical signals output from the first and second arms, which have interfered and have been mixed with each other, to output only the probe signal that has been modulated in the same manner as the pump signal has been modulated, the phase optimization method comprising: feeding back a portion of the output signal of the optical band-pass filter; determining a phase difference between the first and second arms from the feedback signal; and outputting to the second arm a phase control signal that controls the phase difference to increase or decrease the optical power of the optical band-pass filter depending on the phase difference.

According to another aspect of the present invention, a phase optimization method obtains a maximum extinction ratio in a wavelength converter including a first arm having a first semiconductor optical amplifier that is operated with a first predetermined current and amplifies a pump signal and a probe signal, a second arm having a second semiconductor optical amplifier that is operated with a second predetermined current and amplifies the probe signal, and a π phase shifter that controls the phase of the amplified signal, and an optical band-pass filter that filters optical signals output from the first and second arms, which have interfered and have been mixed with each other, to output only the probe signal that has been modulated in the same manner as the pump signal has been modulated, the phase optimization method comprising: feeding back a portion of the output signal of the optical band-pass filter to detect a peak hold voltage signal and a bottom hold voltage signal; determining a phase difference between the first and second arms from a difference between the peak hold and bottom hold voltage signals; and outputting to the second arm a phase control signal that controls the phase difference to increase or decrease the optical power of the optical band-pass filter depending on the phase difference.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1 is a block diagram of a conventional XPM wavelength converter employing a Mach-Zehnder interferometer semiconductor optical amplifier;

DETAILED DESCRIPTION OF THE PREFERRED EMBODIMENTS

Figure 2A:
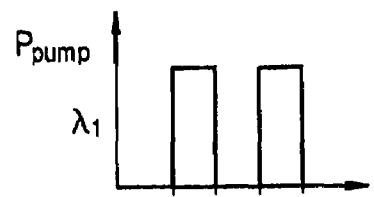
FIGS. 2A-2C illustrate waveforms of input/output signals of the XPM wavelength converter of FIG. 1.
Figure 2B:
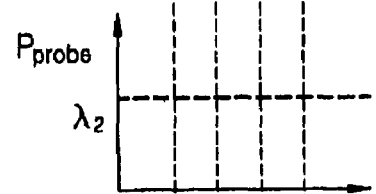
Figure 2C:
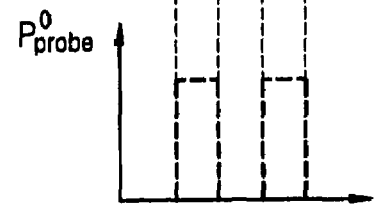

Reference will now be made in detail to the embodiments of the present invention, examples of which are illustrated in the accompanying drawings, wherein like reference numerals refer to the like elements throughout. The embodiments are described below to explain the present invention by referring to the figures.

The present invention will now be described more fully with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete, and will fully convey the concept of the invention to those skilled in the art. Throughout the drawings, like reference numerals refer to like elements.

Figure 4:
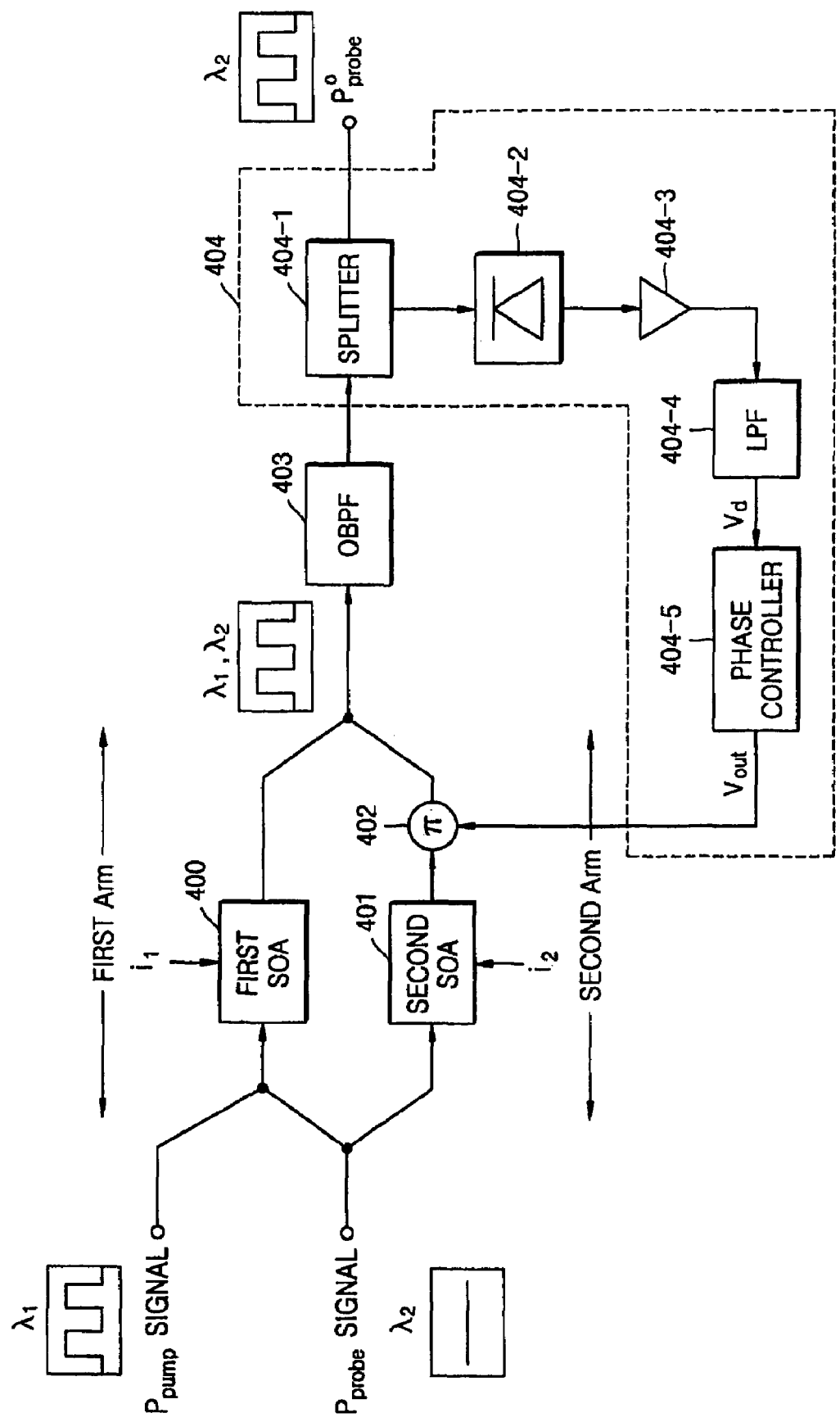
FIG. 4 is a block diagram of a phase optimization apparatus to obtain a maximum extinction ratio in a Mach-Zehnder interferometer wavelength converter using XPM of a semiconductor optical amplifier according to an embodiment of the present invention.

FIG. 4 is a block diagram of a phase optimization apparatus to obtain a maximum extinction ratio in a Mach-Zehnder interferometer wavelength converter using XPM of a semiconductor optical amplifier according to an embodiment of the present invention. The phase optimization apparatus includes a first semiconductor optical amplifier (SOA) 400, a second semiconductor optical amplifier (SOA) 401, a π phase shifter 402, an optical band-pass filter 403, and a phase control unit 404. The phase control unit 404 comprises a splitter 404-1, a photo-diode 404-2, an I/V amplifier 404-3, a low-pass filter 404-4, and a phase controller 404-5.

Figure 5A:
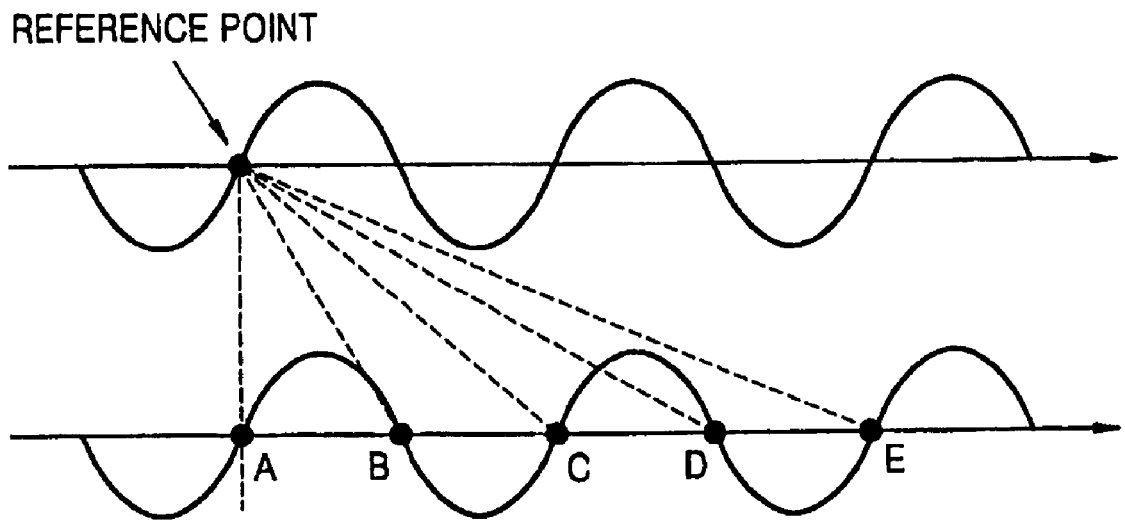
FIG. 5A shows phases of optical wavelengths between first and second arms.
Figure 5B:
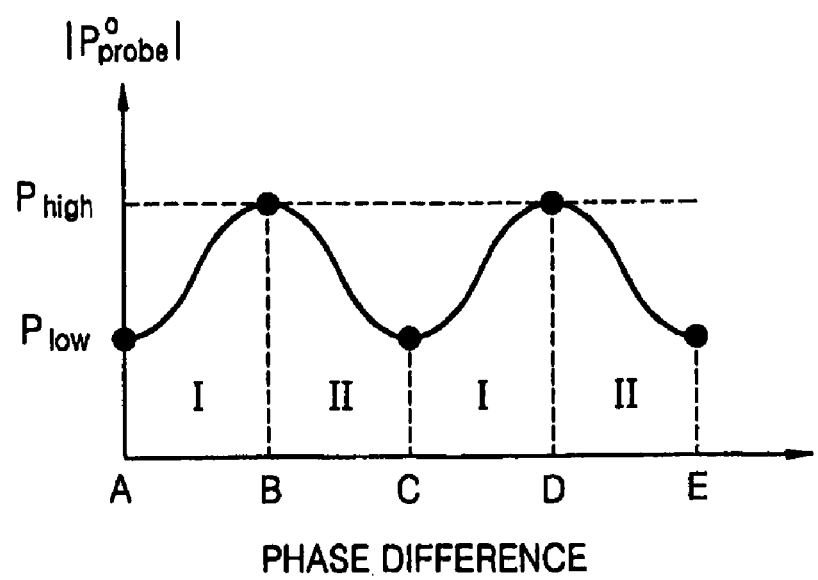
FIG. 5B shows transfer characteristics of the phases.

FIG. 5A shows phases of optical wavelengths between first and second arms, and FIG. 5B shows transfer characteristics of the phases.

Figure 6:
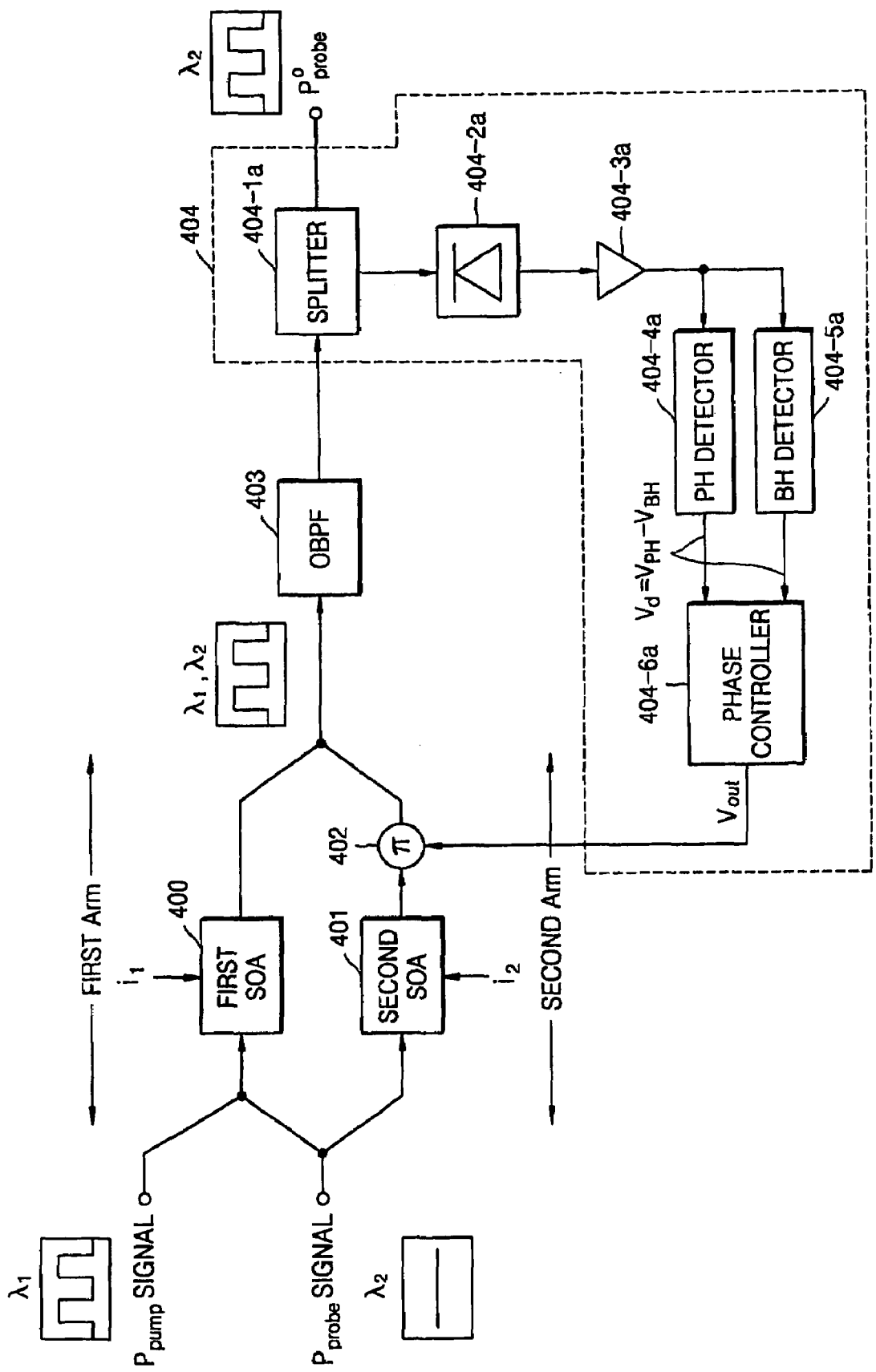
FIG. 6 is a block diagram of another embodiment of the phase optimization apparatus of FIG. 4, in which a phase control unit has a modified structure.

FIG. 6 is a block diagram of another embodiment of the phase optimization apparatus of FIG. 4, in which the phase control unit 404 has a modified structure. Referring to FIG. 6, the phase control unit 404 includes a splitter 404-1a, a photo-diode 404-2a, an I/V amplifier 404-3a, a Peak Hold (PH) detector 404-4a, a Bottom Hold (BH) detector 404-5a, and a phase controller 404-6a.

Figure 7:
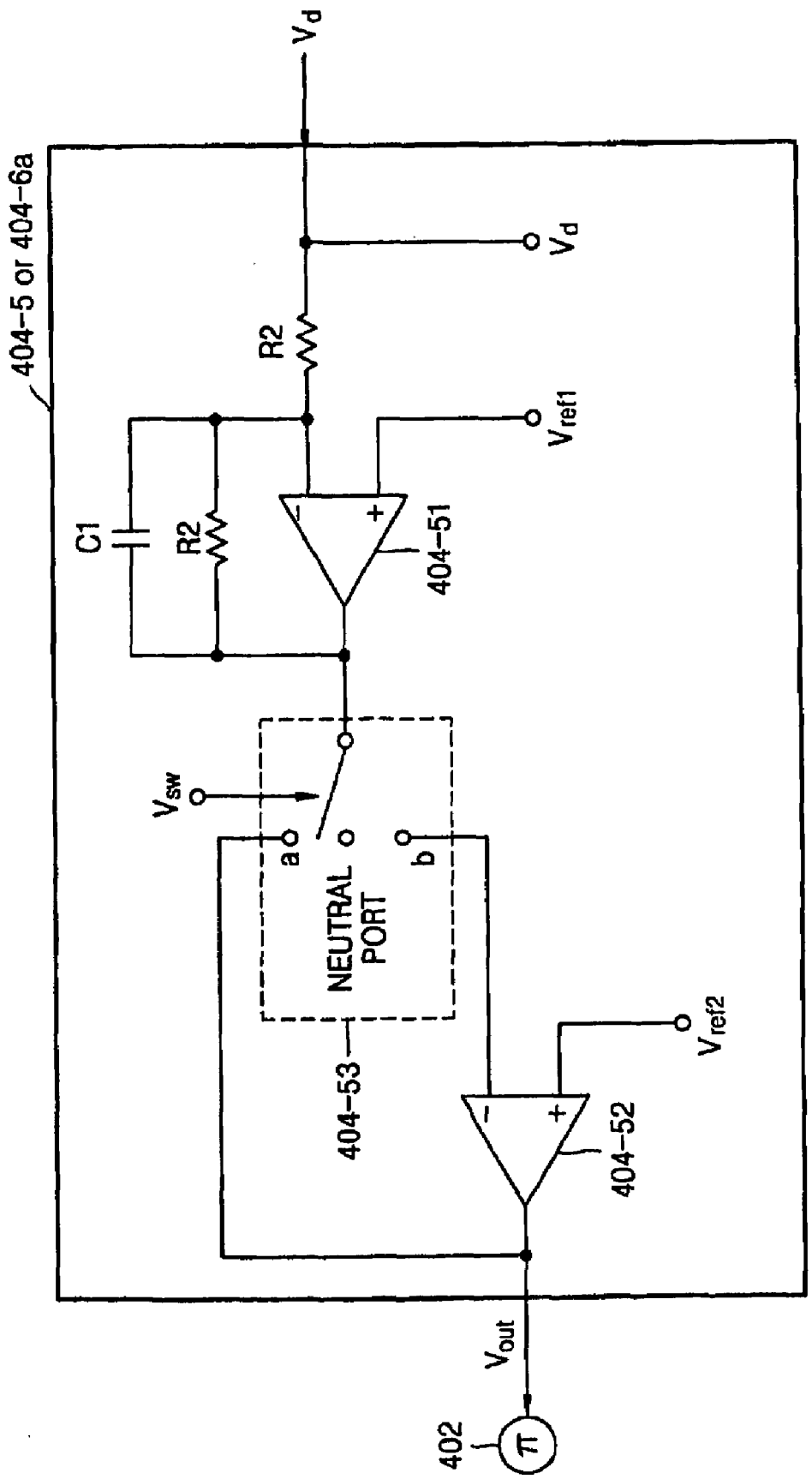
FIG. 7 is a circuit diagram of an embodiment of a phase controller shown in FIGS. 4 and 6.

FIG. 7 is a circuit diagram of an embodiment of the phase controller 404-5/404-6a of FIGS. 4 and 6. Referring to FIG. 7, the phase controller 404-5/404-6a includes an integrator 404-51, a comparator 404-52, and a switch 404-53.

Figure 8:
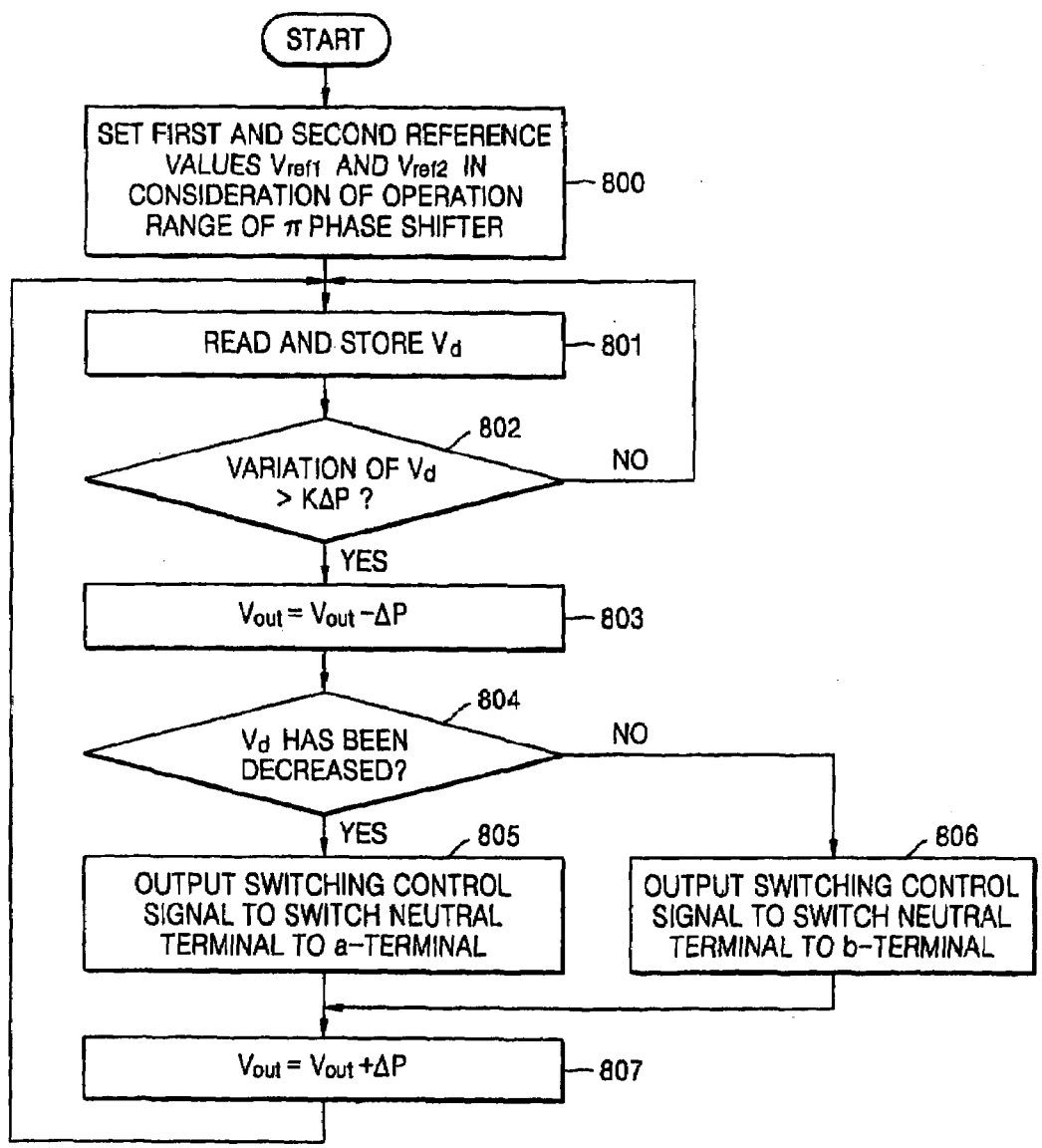
FIG. 8 is a flow chart showing a method of generating a switching control signal when the phase controller of FIG. 7 is operated.

FIG. 8 is a flow chart showing a method of generating a switching control signal when the phase controller of FIG. 7 is operated.

An embodiment of the phase optimization apparatus to obtain a maximum extinction ratio in a Mach-Zehnder interferometer wavelength converter using XPM of a semiconductor optical amplifier according to the present invention will now be explained in detail with reference to FIGS. 3 through 8.

The first semiconductor optical amplifier (SOA) 400 that operates with current $i_1$ amplifies a pump signal and a probe signal input thereto and shifts phases of the signals according to XPM. Here, the pump signal is a modulated optical pulse signal having a wavelength λ1 and the probe signal is a continuous wave optical signal having a wavelength λ2. The part of the phase optimization apparatus that amplifies the pump signal and probe signal using the first semiconductor optical amplifier 400 is designated as a first arm.

The second semiconductor optical amplifier 401 operates with current $i_2$ and amplifies the probe signal.

The π phase shifter 402 controls an output phase of a second arm according to a phase control signal. The second arm is the part the of the phase optimization apparatus that amplifies the probe signal using the second semiconductor optical amplifier 401 and phase-shifts the output of the second semiconductor optical amplifier 401 by the π phase shifter 402.

The optical band-pass filter 403 filters the pump signal from the result of interfering the output signals of the first and second arms with each other, and outputs only the probe signal.

In the MZI structure, the phase of the second arm is retarded by π from the phase of the first arm by the π phase shifter 402. The first arm has no phase delay at a low pump power, but has a phase difference corresponding to π at a high pump power due to XPM. Accordingly, the phase difference between the first and second arms is π at a low pump power and zero at a high pump power in the MZI structure. A probe power is subjected to the phase difference so that the probe signal and pump signal are modulated in the same manner. That is, constructive interference occurs when the phase difference between the first and second arms is 2nπ and destructive interference occurs when the phase difference is (2n+1)π, where n=0,1,2,3, . . . . Due to the interference, the signal having the wavelength λ1 is phase-converted into the signal with the wavelength λ2, generating an output signal $P°_{probe}$.

The phase control unit 404 receives as feedback a portion of the output signal of the optical band-pass filter 403 and outputs a phase control signal $V_{out}$ to the π phase shifter 402. The phase control signal $V_{out}$ changes the phase difference between the first and second arms to increase or decrease the optical power of the optical band-pass filter 403 depending on the phase difference.

Figure 3:
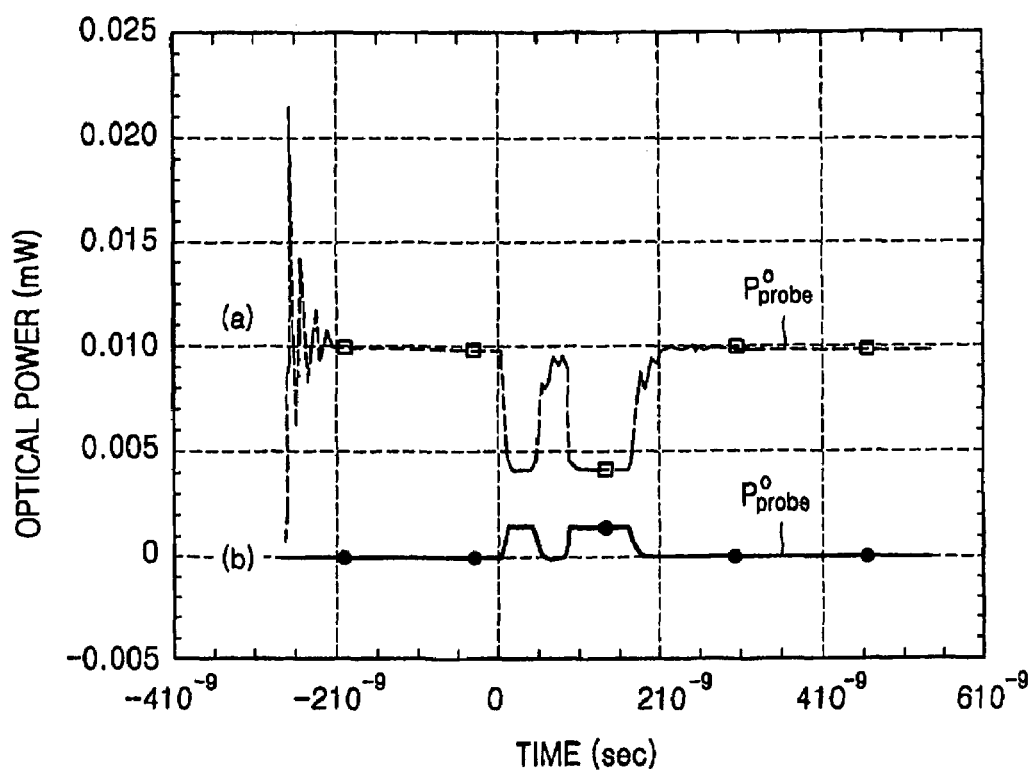
FIG. 3 illustrates waveforms of probe output signals of the wavelength converter of FIG. 1, for two different phase shifts of a π phase shifter.

The probe output signal of the optical band-pass filter 403 for two different phase shifts of the π phase shifter 402 is shown in FIG. 3. In FIG. 3, (a) is a probe output signal when the phase difference between the first and second arms is zero and (b) is a probe output signal when the phase different is π.

The extinction ratio (ER) is given by:

ER=10log(peak level/bottom level)

Thus, as the phase difference between the first and second arms approaches zero, the average and peak/bottom levels of the probe signal gradually increase to result in a decrease in the extinction ratio, as shown in FIG. 3, line (b). Accordingly, the phase control unit 404 should generate the phase control signal Vout to cause the probe signal to have low average and peak/bottom levels and output the phase control signal Vout to the π phase shifter 402.

FIG. 5A shows phases of optical wavelengths between first and second arms. In FIG. 5A, in consideration of a phase difference at a high optical power, points A, C and E have the same phase and each of them has a phase difference of 2nπ (n=0,1,2,3, . . . ) from a reference point at a high optical power level. Points B and D each have a phase difference of (2n+1)π from the reference point.

At the points A, C and E having the phase difference of 2nπ from the reference point, the average and peak/bottom levels of the probe optical power output from the optical band-pass filter 403 reach a minimum to result in a maximum extinction ratio. At the points B and D having the phase difference of (2n+1)π from the reference point, the average and peak/bottom levels become a maximum so the extinction ratio reaches a minimum. This transfer characteristic is shown in FIG. 5B.

Upon operation of the phase control unit 404, the splitter 404-1 separates a portion of the output signal of the optical band-pass filter 403, that is, the probe signal, from the output signal, in order to output the phase control signal Vout for obtaining a maximum extinction ratio to the π phase shifter 402. The photo-diode 404-2 converts the probe signal output from the splitter 404-1 into a current signal. The I/V amplifier 404-3 converts the current signal output from the photo-diode 404-2 into a voltage signal. The low-pass filter (LPF) 404-4 low-pass-filters the voltage signal output from the I/V amplifier 404-3 to output a voltage signal Vd.

The phase controller 404-5 converts the output signal Vd of the low-pass filter 404-4 into a digital voltage signal and determines whether the phase difference between the first and second arms resides in region I or region II of FIG. 5B from the digital voltage signal. Here, region I means that the phase difference between the first and second arms is 2nπ (points A, C and E) and region II means that the phase difference corresponds to (2n+1)π (points B and D).

Referring to FIG. 5B, the phase difference between the first and second arms increases in region I so that the probe optical power output from the optical band-pass filter (OBPF) 403 is improved. In region II, the phase difference decreases to reduce the probe optical power output from the optical band-pass filter 403 so that the probe optical power output from the optical band-pass filter 403 is decreased.

Accordingly, in region I, the phase controller 404-5 outputs the phase control signal Vout that reduces the phase difference between the first and second arms to the π phase shifter 402 until the probe optical power is decreased to the minimum. In region II, the phase controller 404-5 outputs the phase control signal Vout that increases the phase difference between the first and second arms to the π phase shifter 402 until the probe optical power reaches the minimum. Even if a disturbance is applied to the wavelength converter, the phase control unit controls the wavelength converter to maintain the maximum power in the above manner.

FIG. 6 is a block diagram of another embodiment of the phase optimization apparatus of FIG. 4, in which a phase control unit 404 has a modified structure. In FIG. 6, components other than the phase control unit 404 are identical to those shown in FIG. 4.

Upon operation of the phase control unit 404, the splitter 404-1a separates a portion of the output signal of the optical band-pass filter 403, that is, the probe signal, from the output signal in order to output a phase control signal Vout for obtaining a maximum extinction ratio to the π phase shifter 402. The photo-diode 404-2a converts the probe signal output from the splitter 404-1a into a current signal. The I/V amplifier 404-3a converts the current signal output from the photo-diode 404-2a into a voltage signal. The PH detector 404-3a detects a PH signal VPH from the voltage signal output from the I/V amplifier 404-3a. The BH detector 404-5a detects a BH signal VBH from the voltage signal output from the I/V amplifier 404-3a.

The phase controller 404-6a determines whether the phase difference between the first and second arms resides in region I or region II of FIG. 5B from the output signals VPH and VBH of the PH detector 404-4a and the BH detector 404-5a. The phase controller 404-6a determines the phase difference between the first and second arms using a difference Vd between the output signal VPH of the PH detector 404-4a and the output voltage VBH of the BH detector 404-5a.

Here, region I means that the phase difference between the first and second arms is 2nπ (points A, C and E) and region II means that the phase difference corresponds to (2n+1)π (points B and D).

In region I, the phase difference between the first and second arms increases so that the probe optical power output from the optical band-pass filter 403 is improved. In region II, the phase difference decreases to reduce the probe optical power output from the optical band-pass filter 403.

Accordingly, in region I, the phase controller 404-6a outputs the phase control signal Vout that reduces the phase difference between the first and second arms to the 7C phase shifter 402 until the probe optical power is decreased to the minimum. In region II, the phase controller 404-6a outputs the phase control signal Vout that increases the phase difference between the first and second arms to the π phase shifter 402 until the probe optical power reaches the minimum.

FIG. 7 is a circuit diagram of an embodiment of the phase controller 404-5 or 404-6a.

Referring to FIG. 7, the integrator 404-51 integrates the output signal Vd of the low-pass filter 404-4 or the difference Vd between the output signals of the PH detector 404-4a and the BH detector 404-5a using a first reference signal Vref1 as an offset signal. The output signal of the integrator 404-51 corresponds to $-(R2/R1)Vd$.

The comparator 404-52 compares the output signal of the integrator 404-51 with a second reference signal Vref2 and outputs a difference signal of the two signals.

The switch 404-53 switches the output signal of the integrator 404-51 according to a switching control signal VSW and outputs it to the π phase shifter 402. Otherwise, the switch 404-53 switches the output signal of the integrator 404-51 to the comparator 404-52 to cause the output signal of the comparator 404-52 to be applied to the π phase shifter 402. Here, the switching control signal corresponds to a phase difference judgement signal of the phase controller 404-5 or 404-6a. The phase controller 404-5 or 404-6a subtracts a resolution value Δp of the π phase shifter 402 from the previous phase control signal Vout and, when the subtraction result has decreased from a previous value, determines that the phase difference between the first and second arms resides in region I (points A, C and E). When the subtraction result has increased from the previous value, the phase controller determines that the phase difference corresponds to region II (points B and D). Here, the resolution value Δp of the π phase shifter 402 means the magnitude of phase shifted by the π phase shifter 402.

When the phase controller 404-5 or 404-6a determines that the phase difference between the first and second arms resides in region I, the output signal of the integrator 404-51 becomes the phase control signal Vout. At this time, the phase controller outputs the switching control signal VSW that is applied to the π phase shifter 402 in the neutral state. The output signal of the integrator 404-51 corresponds to the phase control signal Vout that reduces the phase difference between the first and second arms until the probe optical power reaches the minimum.

When the phase controller 404-5 or 404-6a determines that the phase difference between the first and second arms corresponds to region II, the output signal of the comparator 404-52 becomes the phase control signal Vout. At this time, the phase controller 404-5 or 404-6a outputs the switching control signal VSW that causes the output signal of the integrator 404-51 to be switched to the comparator 404-52 in the neutral state. The output signal of the comparator 404-52 corresponds to the phase control signal Vout that increases the phase difference between the first and second arms until the probe optical power reaches the minimum.

A method of generating the switching control signal when the phase controller 404-5 or 404-6a is operated will now be explained in detail with reference to FIG. 8.

In operation 800, the phase controller 404-5 or 404-6a sets the first and second reference values Vref1 and Vref2 in consideration of the operational range of the π phase shifter 402. Here, the first reference value Vref1 is the offset signal of the integrator 404-51 and the second reference value Vref2 is the reference signal of the comparator 404-52.

In operation 801, the phase controller reads and stores the output signal Vd of the low-pass filter 404-4 or the difference Vd between the output signals VPH and VBH of the PH detector 404-4a and BH detector 404-5a.

Then, in operation 802, the phase controller 404-5 or 404-6a determines if a variation of the stored signal Vd is larger than a Kth resolution value KΔp. Here, the resolution value Δp means the magnitude of phase shifted by the π phase shifter 402. When the variation of the stored signal Vd is smaller than the Kth resolution value KΔp, the routine returns to operation 801 to read and store the value Vd again.

When the variation of the stored signal Vd is larger than the Kth resolution value KΔp, the phase controller 404-5 or 404-6a outputs a signal corresponding to a difference between the phase control signal Vout and the resolution value Δp as a new phase control signal Vout in operation 803. Then, the wavelength converter is operated according to the new phase control signal Vout.

In operation 804, the phase controller 404-5 or 404-6a determines whether or not the value Vd input thereto has decreased from the previous value. When the value Vd has decreased, the phase controller 404-5 or 404-6a determines that the phase difference between the first and second arms corresponds to region I and outputs the switching control signal VSW that controls the switch 404-53 to be switched to it's a-terminal so as to cause the output signal of the integrator 404-51 to become the phase control signal Vout, in operation 805. The output signal of the integrator 404-51 corresponds to the phase control signal Vout that reduces the phase difference between the first and second arms until the probe optical power reaches the minimum.

When the value Vd has increased, the phase controller 404-5 or 404-6a determines that the phase difference between the first and second arms corresponds to region II and outputs the switching control signal VSW that controls the switch 404-53 to be switched to it's b-terminal so as to cause the output signal of the comparator 404-52 to become the phase control signal Vout, in operation 806. The output signal of the comparator 404-52 corresponds to the phase control signal Vout that increases the phase difference between the first and second arms until the probe optical power reaches the minimum.

In operation 807, the resolution value Δp is added to the phase control signal Vout. Then, the routine returns to operation 801 to repeat the switching control signal generating operation.

Figure 9:
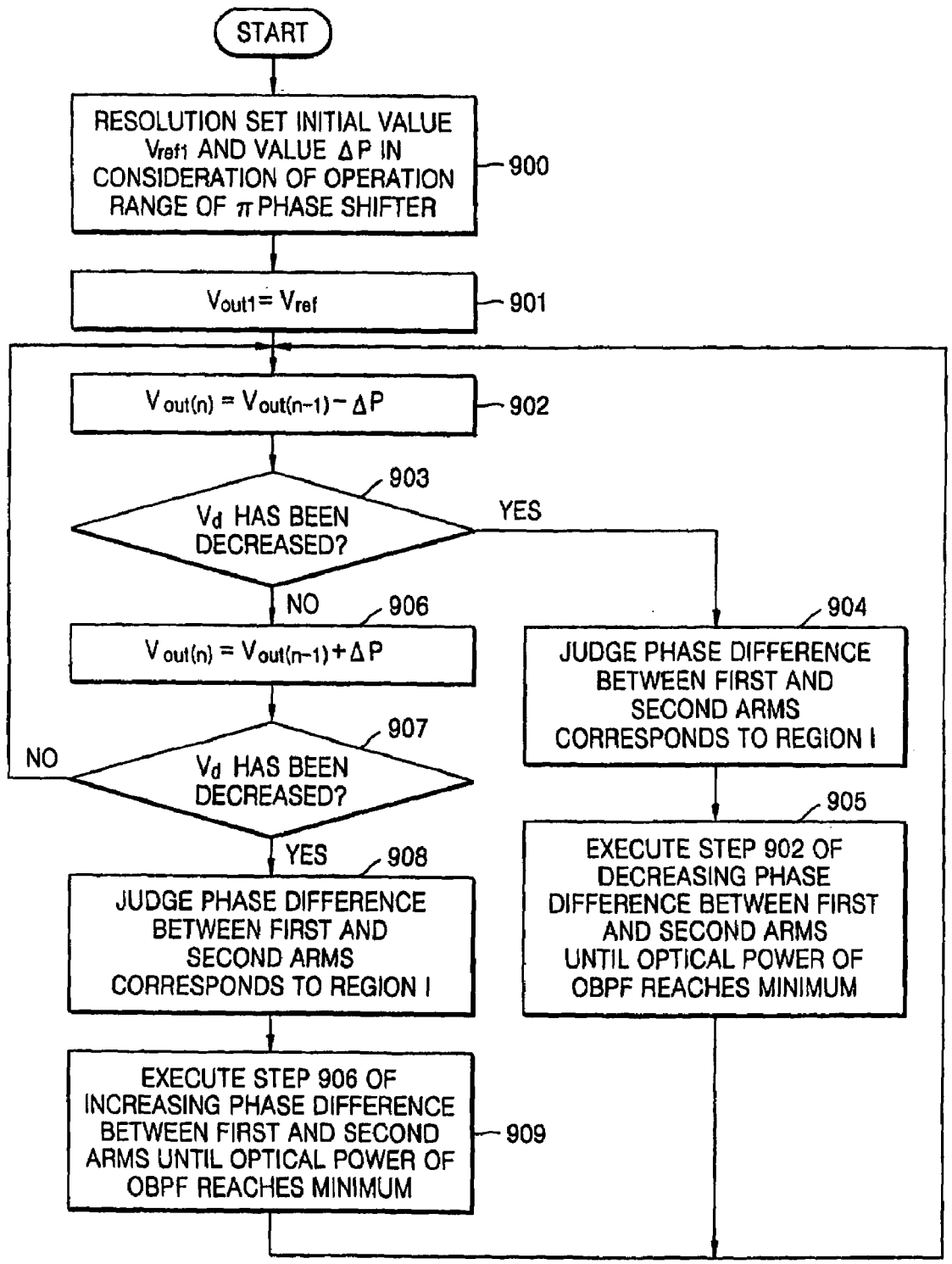
FIG. 9 is a flow chart showing a phase optimization method to obtain a maximum extinction ratio in a Mach-Zehnder interferometer wavelength converter using XPM of a semiconductor optical amplifier according to an embodiment of the present invention.

Next, a phase optimization method for obtaining a maximum extinction ratio in a Mach-Zehnder interferometer wavelength converter using XPM of a semiconductor optical amplifier according to a first embodiment of the present invention will be explained in detail with reference to FIG. 9.

In operation 900, the phase controller 404-5 sets an initial value Vref and resolution value Δp in consideration of the operational range of the π phase shifter 402. Here, the resolution value Δp means the magnitude of phase shifted by the π phase shifter 402.

In operation 901, the phase controller 404-5 sets the first phase control signal Vout1, which is output to the π phase shifter 402, as Vref. Then, in operation 902, the phase controller 404-5 subtracts Δp from the first phase control signal Vout1 to obtain the second phase control signal Vout2 and outputs it to the π phase shifter 402.

The π phase shifter 402 shifts the phase of the output signal of the second arm according to the second phase control signal Vout2. The optical band-pass filter 403 cuts off the pump signal from the result of interfering the output signals of the first and second arms with each other and outputs only the probe signal. The splitter 404-1 separates a portion of the probe signal output from the optical band-pass filter 403 from the signal according to the second phase control signal. The photo-diode 404-2 converts the probe signal output from the splitter 404-1 into a current signal. The I/V amplifier 404-3 converts the current signal output from the photo-diode 404-2 into a voltage signal. The low-pass filter 404-4 low-pass-filters the voltage signal output from the I/V amplifier 404-3 to convert it into the voltage signal Vd.

The phase controller 404-5 converts the output signal of the low-pass filter 404-4 into a digital signal and determines whether or not the digital signal Vd has decreased from the previous value in operation 903. When the signal Vd has been decreased, the phase controller determines that the phase difference between the first and second arms corresponds to region I (points A, C and E), in operation 904. Subsequently, the phase controller 404-5 executes operation 902 that reduces the phase difference between the first and second arms until the optical power of the probe signal that is the output signal of the optical band-pass filter 403 reaches the minimum, in operation 905.

In region I, the phase difference between the first and second arms is increased so that the probe optical power output from the optical band-pass filter 403 is improved. Accordingly, the phase controller 404-5 outputs the phase control signal Vout that reduces the phase difference between the first and second arms until the probe optical power reaches the minimum to the π phase shifter 402. Here, the phase control signal Vout that reduces the phase difference between the first and second arms corresponds to Vout(n)=Vout(n-1)−Δp, obtained in operation 902.

The phase controller 404-5 determines the magnitude of the output signal Vd of the low-pass filter 404-4. When the phase controller 404-5 determines that the signal Vd has increased from the previous value, it adds Δp to the first phase control signal set as the initial value to obtain the second phase control signal Vout(2), in operation 906.

The π phase shifter 402 shifts the phase of the output signal of the second arm according to the second phase control signal Vout(2). The optical band-pass filter 403 cuts off the pump signal from the result of interfering the output signals of the first and second arms with each other, and outputs only the probe signal. The splitter 404-1 separates a portion of the probe signal output from the optical band-pass filter 403 from the signal according to the second phase control signal. The photo-diode 404-2 converts the probe signal output from the splitter 404-1 into a current signal. The I/V amplifier 404-3 converts the current signal output from the photo-diode 404-2 into a voltage signal. The low-pass filter 404-4 low-pass-filters the voltage signal output from the I/V amplifier 404-3 and converts it into the voltage signal Vd.

The phase controller 404-5 converts the output signal of the low-pass filter 404-4 into a digital signal and determines whether or not the digital signal Vd has decreased from the previous value, in operation 907. When the signal Vd has decreased, the phase controller determines that the phase difference between the first and second arms corresponds to region II (points B and D) in operation 908.

Subsequently, the phase controller 404-5 executes operation 906 that increases phase difference between the first and second arms until the optical power of the probe signal that is the output signal of the optical band-pass filter 403 reaches the minimum, in operation 909.

In region II, as the phase difference between the first and second arms increases, the probe optical power output from the optical band-pass filter 403 decreases. Accordingly, the phase controller outputs the phase control signal Vout that increases the phase difference between the first and second arms until the probe optical power reaches the minimum to the π phase shifter 402. Here, the phase control signal Vout that increases the phase difference between the first and second arms corresponds to Vout(n)=Vout(n-1)+Δp, obtained in operation 906.

Figure 10:
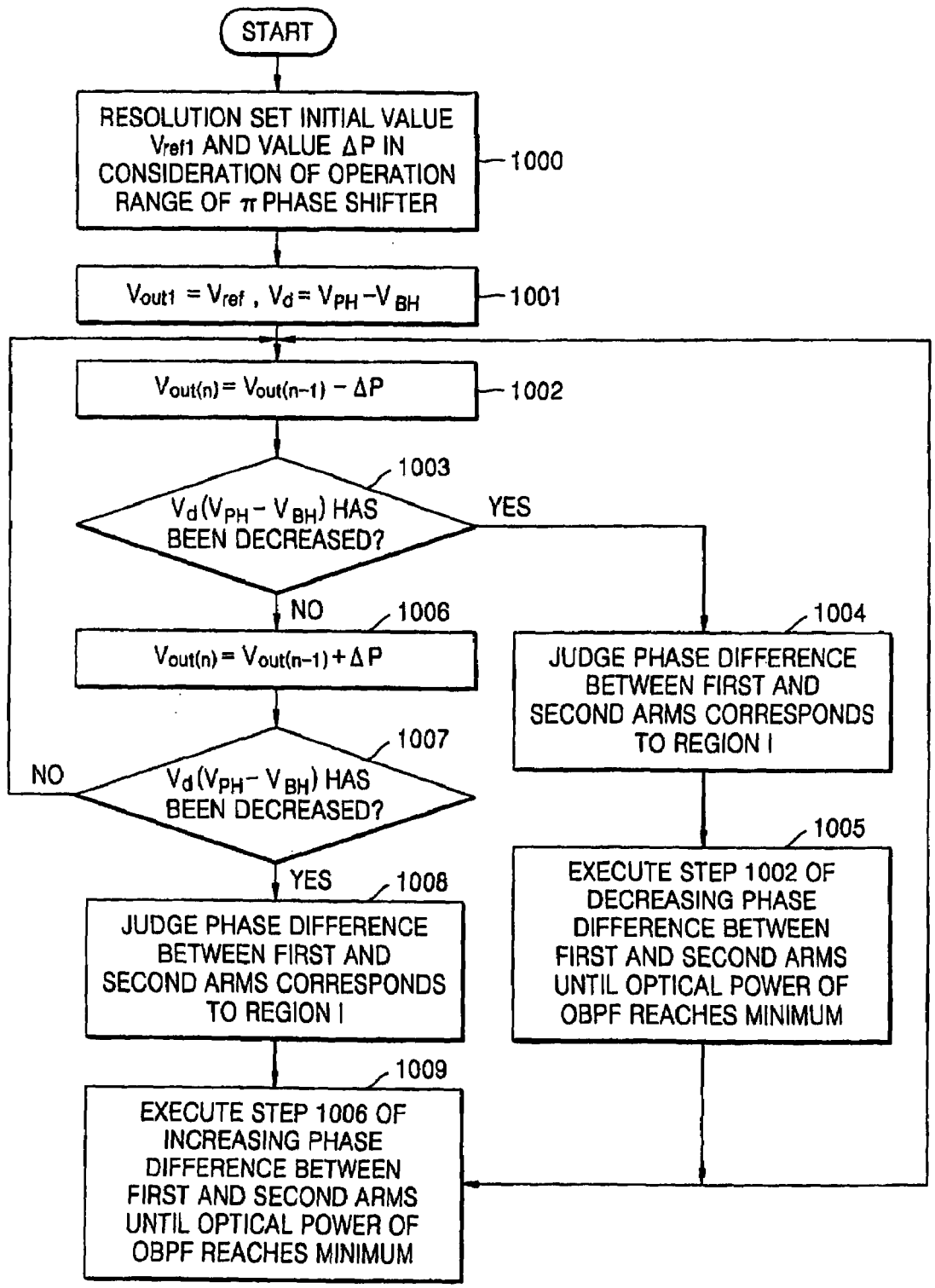
FIG. 10 is a flow chart showing a phase optimization method to obtain a maximum extinction ratio in a Mach-Zehnder interferometer wavelength converter using XPM of a semiconductor optical amplifier according to another embodiment of the present invention.

Next, a phase optimization method for obtaining a maximum extinction ratio in a Mach-Zehnder interferometer wavelength converter using XPM of a semiconductor optical amplifier according to a second embodiment of the present invention will be explained in detail with reference to FIG. 10.

In operation 1000, the phase controller 404-6a sets an initial value Vref and resolution value Δp in consideration of the operational range of the π phase shifter 402. Here, the resolution value Δp means the magnitude of phase shifted by the π phase shifter 402.

In operation 1001, the phase controller 404-6a sets the first phase control signal Vout1, which is output to the π phase shifter 402, as Vref. A signal that is input to the phase controller 404-6a after Vref is set will be Vd=VPH-VBH.

The phase controller 404-6a subtracts Δp from the first phase control signal Vout1 to obtain the second phase control signal Vout2 and outputs it to the π phase shifter 402, in operation 1002.

The π phase shifter 402 shifts the phase of the output signal of the second arm according to the second phase control signal Vout2. The optical band-pass filter 403 cuts off the pump signal from the result of interfering the output signals of the first and second arms with each other, and outputs only the probe signal. The splitter 404-1a separates a portion of the probe signal output from the optical band-pass filter 403 from the signal according to the second phase control signal. The photo-diode 404-2a converts the probe signal output from the splitter 404-1 into a current signal. The I/V amplifier 404-3a converts the current signal output from the photo-diode 404-2 into a voltage signal. The PH detector 404-4a detects a peak hold voltage signal VPH from the voltage signal output from the I/V amplifier 404-3. The BH detector 404-5a detects a bottom hold voltage signal VBH from the voltage signal output from the I/V amplifier 404-3.

The phase controller 404-6a determines if a difference between the peak hold voltage signal VPH and bottom hold voltage signal VBH has decreased from the previous value, in operation 1003. When the difference has decreased, the phase controller determines that the phase difference between the first and second arms corresponds to region I (points A, C and E), in operation 1004.

Subsequently, the phase controller 404-6a executes operation 1002 that reduces the phase difference between the first and second arms until the optical power of the probe signal that is the output signal of the optical band-pass filter 403 reaches the minimum, in operation 1005.

In region I, as the phase difference between the first and second arms increases, the probe optical power output from the optical bandwidth pass filer 403 also increases. Accordingly, the phase controller 404-6a outputs the phase control signal Vout that reduces the phase difference between the first and second arms until the probe optical power reaches the minimum to the π phase shifter 402. Here, the phase control signal Vout that reduces the phase difference between the first and second arms corresponds to Vout(n)=Vout(n-1)−Δp, obtained in operation 1002.

The phase controller 404-6a determines the magnitude of the difference between the output signals of the PH detector 404-4a and BH detector 404-5a. When the phase controller determines that the difference has increased from the previous value, it adds Δp to the first phase control signal set as the initial value to obtain the second phase control signal Vout(2), in operation 1006.

The π phase shifter 402 shifts the phase of the output signal of the second arm according to the second phase control signal Vout(2). The optical band-pass filter 403 cuts off the pump signal from the result of interfering the output signals of the first and second arms with each other, and outputs only the probe signal. The splitter 404-1 separates a portion of the probe signal output from the optical band-pass filter 403 from the signal according to the second phase control signal. The photo-diode 404-2 converts the probe signal output from the splitter 404-1 into a current signal. The I/V amplifier 404-3 converts the current signal output from the photo-diode 404-2 into a voltage signal. The PH detector 404-4a detects the peak hold voltage signal VPH from the voltage signal output from the I/V amplifier 404-3. The BH detector 404-5a detects the bottom hold voltage signal VBH from the voltage signal output from the I/V amplifier 404-3.

The phase controller 404-6a determines the magnitude of the difference Vd between the peak hold voltage signal VPH and the bottom hold voltage signal VBH in operation 1007. When the difference between the peak hold voltage signal VPH and bottom hold voltage signal VBH has decreased, the phase controller 404-6a determines that the phase difference between the first and second arms corresponds to region II (points B and D), in operation 1008.

Subsequently, the phase controller 404-6a executes operation 1006 that increases the phase difference between the first and second arms until the optical power of the probe signal that is the output signal of the optical band-pass filter 403 reaches the minimum, in operation 1009.

In region II, as the phase difference between the first and second arms increases, the probe optical power output from the optical band-pass filter 403 decreases. Accordingly, the phase controller 404-6a outputs the phase control signal Vout that increases the phase difference between the first and second arms until the probe optical power reaches the minimum to the π phase shifter 402. Here, the phase control signal Vout that increases the phase difference between the first and second arms corresponds to Vout(n)=Vout(n-1)+Δp, obtained in operation 1006.

Figure 11:
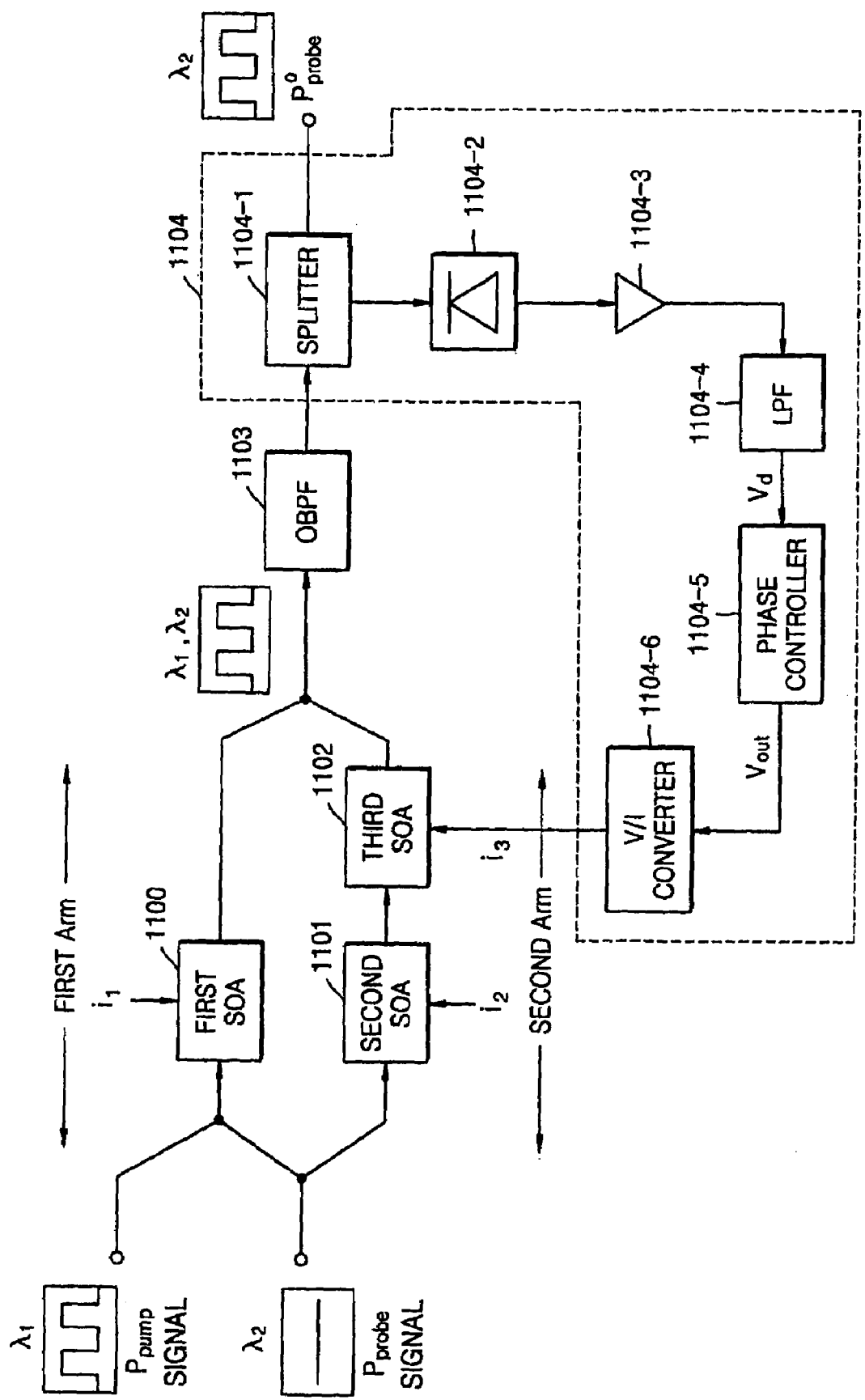
FIG. 11 is a block diagram of a phase optimization apparatus to obtain a maximum extinction ratio in a Mach-Zehnder interferometer wavelength converter using XPM of a semiconductor optical amplifier according to an embodiment of FIG. 10 of the present invention.

FIG. 11 is a block diagram of a phase optimization apparatus to obtain a maximum extinction ratio in a wavelength converter using XPM of a semiconductor optical amplifier according to another embodiment of the present invention. The apparatus includes a first semiconductor optical amplifier 1100, a second semiconductor optical amplifier 1101, a third semiconductor optical amplifier 1102, an optical band-pass filter 1103, and a phase control unit 1104. The phase control unit 1104 comprises a splitter 1104-1, a photo-diode 1104-2, an I/V amplifier 1104-3, a low-pass filter 1104-4, a phase controller 1104-5, and a V/I converter 1104-6.

The first semiconductor optical amplifier 1100, which operates with current i1, amplifies a pump signal Ppump and a probe signal Pprobe input thereto and shifts phases of the signals according to XPM. Here, the pump signal is a modulated optical pulse signal having a wavelength λ1 and the probe signal is a continuous wave optical signal having a wavelength λ2. The part of the phase optimization apparatus that amplifies the pump signal and probe signal using the first semiconductor optical amplifier 1100 is designated a first arm.

The second semiconductor optical amplifier 1101 operates with current i2 and amplifies the probe signal.

The third semiconductor optical amplifier 1102, which operates with current i3, amplifies the output signal of the second semiconductor optical amplifier 1101 and shifts the phase of the output signal of the second semiconductor optical amplifier 1101. The current i3 is varied according to a current control signal.

The part of the phase optimization apparatus that amplifies the probe signal using the second semiconductor optical amplifier 1101 and phase-shifts the output signal of the second semiconductor optical amplifier 1101 by the third semiconductor optical amplifier 1102 is designated as a second arm.

While the phase difference between the first and second arms is controlled by the π phase shifter 402 in the first embodiment of the present invention, the phase difference is adjusted by the third semiconductor amplifier 1102 in the second embodiment of the invention.

The optical band-pass filter 1103 filters the pump signal from the result of interfering the output signals of the first and second arms with each other, and outputs only the probe signal.

The phase control unit 1104 receives as feedback a portion of the output signal of the optical band-pass filter 1103 to obtain a phase control signal Vout, which changes the phase difference between the first and second arms to increase or decrease the optical power of the optical band-pass filter 1103 depending on the phase difference, and converts the phase control signal Vout into a current control signal i3 and outputs it to the third semiconductor optical amplifier 1102.

The extinction ratio (ER) is given by:

ER=10log(peak level/bottom level)

Thus, as the phase difference between the first and second arms approaches zero, the average and peak/bottom levels of the probe signal gradually increase to result in a decrease in the extinction ratio. Accordingly, the phase control unit 1104 should generate a phase control signal to cause the probe signal to have low average and peak/bottom levels, and convert the phase control signal into the current $i_3$ and output it to the third semiconductor optical amplifier 1102.

FIG. 5A shows phases of optical wavelengths between first and second arms. In FIG. 5A, in consideration of a phase difference at a high optical power, points A, C and E have the same phase and each of them has a phase difference of 2nπ (n=0,1,2,3, . . . ) from a reference point at a high optical power level. Points B and D each have a phase difference of (2n+1)π from the reference point.

At the points A, C and E having the phase difference of 2nπ from the reference point, the average and peak/bottom levels of the probe optical power output from the optical band-pass filter 1103 reach the minimum to result in the maximum extinction ratio. At the points B and C having the phase difference of (2n+1)π from the reference point, the average and peak/bottom levels become the maximum so the extinction ratio reaches the minimum. This transfer characteristic is shown in FIG. 5B.

Upon operation of the phase control unit 1104, the splitter 1104-1 separates a portion of the output signal of the optical band-pass filter 1103, that is, the probe signal, from the output signal, in order to output a current control signal that makes the extinction ratio reach the maximum to the second arm. The photo-diode 1104-2 converts the probe signal output from the splitter 1104-1 into a current signal. The I/V amplifier 1104-3 converts the current signal output from the photo-diode 1104-2 into a voltage signal. The low-pass filter 1104-4 low-pass-filters the voltage signal output from the I/V amplifier 1104-3 and outputs a voltage signal $V_d$.

The phase controller 1104-5 converts the output signal $V_d$ of the low-pass filter 1104-4 into a digital voltage signal and determines whether the phase difference between the first and second arms corresponds to region I or region II of FIG. 5B from the digital voltage signal $V_d$. Here, region I means that the phase difference between the first and second arms is 2nπ (points A, C and E) and region II means that the phase difference corresponds to (2n+1)π (points B and D).

The phase difference between the first and second arms increases in region I so that the probe optical power output from the optical band-pass filter 1103 is improved. In region II, the phase difference decreases to reduce the probe optical power output from the optical band-pass filter 1103.

Accordingly, in region I, the phase controller 1104-5 outputs a phase control signal $V_{out}$ that reduces the phase difference between the first and second arms until the probe optical power is decreased to the minimum. In region II, the phase controller 1104-5 outputs a phase control signal $V_{out}$ that increases the phase difference between the first and second arms until the probe optical power reaches the minimum. Even if a disturbance is applied to the wavelength converter, the phase control unit 1104 controls the wavelength converter to maintain the maximum power in the above manner.

The V/I converter 1104-6 converts the phase control signal $V_{out}$ output from the phase controller 1104-5 into the current control signal $i_3$ and outputs it to the third semiconductor optical amplifier 1102.

The construction of the phase control unit 404 shown in FIG. 6 may be applied to the phase control unit 1104 of FIG. 11.

Figure 12:
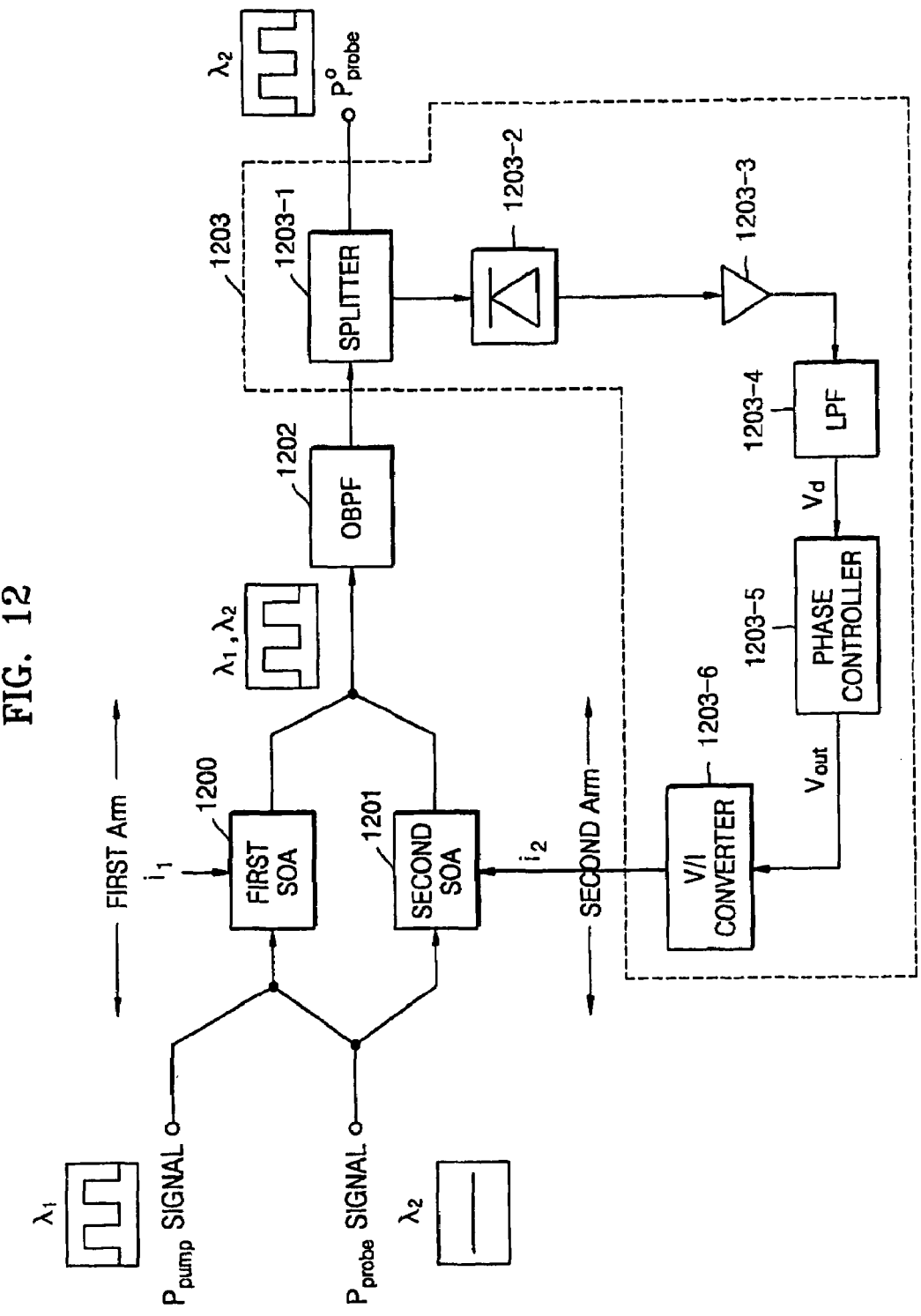
FIG. 12 is a block diagram of a phase optimization apparatus for obtaining a maximum extinction ratio in a Mach-Zehnder interferometer wavelength converter using XPM of a semiconductor optical amplifier according to yet another embodiment of the present invention.

FIG. 12 is a block diagram of a phase optimization apparatus for obtaining a maximum extinction ratio in a wavelength converter using XPM of a semiconductor optical amplifier according to a third embodiment of the present invention. The apparatus includes a first semiconductor optical amplifier 1200, a second semiconductor optical amplifier 1201, an optical band-pass filter 1202, and a phase control unit 1203. The phase control unit 1203 includes a splitter 1203-1, a photo-diode 1203-2, an I/V amplifier 1203-3, a low-pass filter 1203-4, a phase controller 1203-5, and a V/I converter 1203-6.

The first semiconductor optical amplifier 1200, which operates with current $i_1$, amplifies a pump signal $P_{pump}$ and a probe signal $P_{probe}$ input thereto and shifts phases of the signals according to XPM. Here, the pump signal is a modulated optical pulse signal having a wavelength $\lambda 1$ and the probe signal is a continuous wave optical signal having a wavelength $\lambda 2$. The part of the phase optimization apparatus that amplifies the pump signal and probe signal using the first semiconductor optical amplifier 1200 is designated a first arm.

The second semiconductor optical amplifier 1201 operates with current $i_2$ and amplifies the probe signal. The current $i_2$ is varied by a current control signal.

The part of the phase optimization apparatus that amplifies the probe signal using the second semiconductor optical amplifier 1201 is designated a second arm.

While the phase difference between the first and second arms is controlled by the $\pi$ phase shifter 402 in an embodiment of the present invention and controlled by the third semiconductor optical amplifier 1002 in another embodiment, the phase difference is adjusted by the second semiconductor amplifier 1202 in yet another embodiment of the invention.

The optical band-pass filter 1202 filters the pump signal from the result of interfering the output signals of the first and second arms with each other, and outputs only the probe signal.

The phase control unit 1203 receives as feedback a portion of the output signal of the optical band-pass filter 1202 to obtain a phase control signal $V_{out}$, which changes the phase difference between the first and second arms to increase or decrease the optical power of the optical band-pass filter 1202 depending on the phase difference, and converts the phase control signal $V_{out}$ into a current control signal $i_2$ and applies it to the second semiconductor optical amplifier 1201.

The extinction ratio (ER) is given by:

ER=10log(peak level/bottom level)

Thus, as the phase difference between the first and second arms approaches zero, the average and peak/bottom levels of the probe signal gradually increase to result in a decrease in the extinction ratio. Accordingly, the phase control unit 1203 should generate a phase control signal to cause the probe signal to have low average and peak/bottom levels, and convert the phase control signal into the current $i_2$ and output it to the second semiconductor optical amplifier 1201.

FIG. 5A shows phases of optical wavelengths between first and second arms. In FIG. 5(a), in consideration of a phase difference at a high optical power, points A, C and E have the same phase and each of them has a phase difference of $2n\pi$ (n=0,1,2,3, . . . ) from a reference point at a high optical power level. Points B and D each have a phase difference of $(2n+1)\pi$ from the reference point.

At the points A, C and E having the phase difference of $2n\pi$ from the reference point, the average and peak/bottom levels of the probe optical power output from the optical band-pass filter 1203 reach the minimum to result in the maximum extinction ratio. At the points B and C having the phase difference of $(2n+1)\pi$ from the reference point, the average and peak/bottom levels become the maximum so the extinction ratio reaches the minimum. This transfer characteristic is shown in FIG. 5B.

Upon operation of the phase control unit 1203, the splitter 1203-1 separates a portion of the output signal of the optical band-pass filter 1202, that is, the probe signal, from the output signal in order to output a current control signal that makes the extinction ratio reach the maximum to the second arm. The photo-diode 1203-2 converts the probe signal output from the splitter 1203-1 into a current signal. The I/V amplifier 1203-3 converts the current signal output from the photo-diode 1203-2 into a voltage signal. The low-pass filter 1203-4 low-pass-filters the voltage signal output from the I/V amplifier 1203-3 to output a voltage signal $V_d$.

The phase controller 1203-5 converts the output signal $V_d$ of the low-pass filter 1203-4 into a digital voltage signal and determines whether the phase difference between the first and second arms corresponds to region I or region II of FIG. 5B from the digital voltage signal $V_d$. Here, region I means that the phase difference between the first and second arms is $2n\pi$ (points A, C and E) and region II means that the phase difference corresponds to $(2n+1)\pi$ (points B and D).

The phase difference between the first and second arms increases in region I so that the probe optical power output from the optical band-pass filter 1202 is improved. In region II, the phase difference decreases to reduce the probe optical power output from the optical band-pass filter 1202.

Accordingly, in region I, the phase controller 1203-5 outputs a phase control signal $V_{out}$ that reduces the phase difference between the first and second arms until the probe optical power is decreased to the minimum. In region II, the phase controller 1203-5 outputs a phase control signal $V_{out}$ that increases the phase difference between the first and second arms until the probe optical power reaches the minimum. Even if a disturbance is applied to the wavelength converter, the phase control unit 1203 controls the wavelength converter to maintain the maximum power in the above manner.

The V/I converter 1203-6 converts the phase control signal $V_{out}$ output from the phase controller 1203-5 into the current control signal $i_2$ and outputs it to the second semiconductor optical amplifier 1201.

The construction of the phase control unit 404 shown in FIG. 6 may be applied to the phase control unit 1203 of FIG. 12.

As described above, the present invention receives as feedback a portion of an optical signal output from a Mach-Zehnder interferometer wavelength converter using XPM of a semiconductor optical amplifier to maintain an optimum phase difference between two arms, thereby obtaining a maximum extinction ratio. Thus, a minimum BER can be maintained.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A phase optimization apparatus comprising:
   a first arm having a first semiconductor optical amplifier that is operated with a first predetermined current and amplifies a pump signal and a probe signal;
   a second arm having a second semiconductor optical amplifier that is operated with a second predetermined current and amplifies the probe signal, and a $\pi$ phase shifter that controls the phase of the amplified probe signal;
   an optical band-pass filter that filters optical signals output from the first and second arms, which have interfered and have been mixed with each other, and outputs the probe signal that has been modulated in a same manner as the pump signal has been modulated; and
   a phase control unit that receives as feedback a portion of the output signal of the band-pass filter and outputs a phase control signal, which controls a phase difference between the first and second arms to increase or decrease an optical power of the band-pass filter depending on the phase difference, to the it phase shifter of the second arm;
   wherein the phase control unit comprises:
   a splitter that separates a portion of the optical output signal of the optical band-pass filter from the output signal;
   a first converter that converts the separated optical signal into a current signal;
   a second converter that converts the current signal into a voltage signal;
   a low-pass filter that low-pass-filters the voltage signal; and a phase controller that determines the phase difference between the first and second arms from the output signal of the low-pass filter, and outputs to the second arm a phase control signal that controls the phase difference to increase or decrease the optical power of the optical band-pass filter according to the phase difference.

2. The phase optimization apparatus as claimed in claim 1, wherein the phase controller outputs a phase control signal that reduces the phase difference until the optical power of the optical band-pass filter reaches a minimum, to the second arm, when the phase difference is $2n\pi$.

3. The phase optimization apparatus as claimed in claim 1, wherein the phase controller outputs a phase control signal that increases the phase difference until the optical power of the optical band-pass filter reaches a minimum, to the second arm, when the phase difference is $(2n+1)\pi$.

4. The phase optimization apparatus as claimed in claim 1, wherein the phase controller includes:
   an integrator that integrates the output signal of the low-pass filter using a first reference signal as an offset signal;
   a comparator that compares the output signal of the integrator with a second reference signal and outputs a difference between the two signals to the second arm; and
   a switch that switches the output signal of the integrator to the second arm or switches the output signal of the integrator to the comparator, in a neutral state, according to a switching control signal.

5. The phase optimization apparatus as claimed in claim 4, wherein the phase controller determines the phase difference between the first and second arms from the output signal of the low-pass filter and outputs the switching control signal according to the phase difference.

6. The phase optimization apparatus as claimed in claim 4, wherein the phase controller outputs a switching control signal that switches the output signal of the integrator in the neutral state when the phase difference is $2n\pi$.

7. The phase optimization apparatus as claimed in claim 4, wherein the phase controller outputs a switching control signal that switches the output signal of the comparator in the neutral state when the phase difference is $(2n+1)\pi$.

8. A phase optimization apparatus comprising:
   a first arm having a first semiconductor optical amplifier that is operated with a first predetermined current and amplifies a pump signal and a probe signal;
   a second arm having a second semiconductor optical amplifier that is operated with a second predetermined current and amplifies the probe signal, and a $\pi$ phase shifter that controls the phase of the amplified probe signal;
   an optical band-pass filter that filters optical signals output from the first and second arms, which have interfered and have been mixed with each other, and outputs the probe signal that has been modulated in a same manner as the pump signal has been modulated; and
   a phase control unit that receives as feedback a portion of the output signal of the band-pass filter and outputs a phase control signal, which controls a phase difference between the first and second arms to increase or decrease an optical power of the band-pass filter depending on the phase difference, to the $\pi$ phase shifter of the second arm;
   wherein the phase control unit comprises;
   a splitter that separates a portion of the optical output signal of the optical band-pass filter from the output signal;
   a first converter that converts the separated portion of the optical signal into a current signal; a second converter that converts the current signal into a voltage signal;
   a first detector that detects a peak hold signal from the voltage signal;
   a second detector that detects a bottom hold signal from the voltage signal; and
   a phase controller that determines the phase difference between the first and second arms from a difference between the peak hold signal and bottom hold signal of the first and second detectors, and outputs to the second arm a phase control signal that controls the phase difference to increase or decrease the optical power of the optical band-pass filter according to the phase difference.

9. The phase optimization apparatus as claimed in claim 8, wherein the phase controller outputs a phase control signal that reduces the phase difference until the optical power of the optical band-pass filter reaches a minimum, to the second arm, when the phase difference is $2n\pi$.

10. The phase optimization apparatus as claimed in claim 8, wherein the phase controller outputs a phase control signal that increases the phase difference until the optical power of the optical band-pass filter reaches a minimum, to the second arm, when the phase difference is $(2n+1)\pi$.

11. The phase optimization apparatus as claimed in claim 8, wherein the phase controller includes:
an integrator that integrates the difference between the peak hold signal and bottom hold signal of the first and second detectors using a first reference signal as an offset signal;
a comparator that compares the output signal of the integrator with a second reference signal and outputs a difference between the two signals to the second arm; and
a switch that switches the output signal of the integrator to the second arm or switches the output signal of the integrator to the comparator, in the neutral state, according to a switching control signal.

12. The phase optimization apparatus as claimed in claim 11, wherein the phase controller determines the phase difference between the first and second arms from the difference between the peak hold signal and bottom hold signal of the first and second detectors and outputs the switching control signal according to the phase difference.

13. The phase optimization apparatus as claimed in claim 11, wherein the phase controller outputs a switching control signal that switches the output signal of the integrator, in the neutral state, when the phase difference is $2n\pi$.

14. The phase optimization apparatus as claimed in claim 11, wherein the phase controller outputs a switching control signal that switches the output signal of the comparator, in the neutral state, when the phase difference is $(2n+1)\pi$.

15. A phase optimization method to obtain a maximum extinction ratio in a wavelength converter including a first arm having a first semiconductor optical amplifier that is operated with a first predetermined current and amplifies a pump signal and a probe signal, a second arm having a second semiconductor optical amplifier that is operated with a second predetermined current and amplifies the probe signal, and a $\pi$ phase shifter that controls the phase of the amplified signal, and an optical band-pass filter that filters optical signals output from the first and second arms, which have interfered and have been mixed with each other, to output only the probe signal that has been modulated in a same manner that the pump signal has been modulated, the phase optimization method comprising:
feeding back a portion of the output signal of the optical band-pass filter; determining a phase difference between the first and second arms from the feedback signal; and
outputting to the second arm a phase control signal that controls the phase difference to increase or decrease the optical power of the optical band-pass filter depending on the phase difference;
wherein feeding back a portion of the output signal of the optical band-pass filter comprises:
separating a portion of the output signal of the optical band-pass filter from the output signal; converting the separated signal into a current signal; converting the current signal into a voltage signal; and
low-pass-filtering the voltage signal.

16. The phase optimization method as claimed in claim 15, wherein determining a phase difference between the first and second arms from the feedback signal comprises:
subtracting a resolution value of the $\pi$ phase shifter from the previous phase control signal or adding the resolution value to the previous phase control signal;
determining that the phase difference is $2n\pi$ when the low-pass-filtered signal is decreased according to the subtraction result; and
determining that the phase difference is $(2n+1)\pi$ when the low-pass-filtered signal is increased according to the addition result.

17. The phase optimization method as claimed in claim 15, wherein in outputting to the second arm a phase control signal that controls the phase difference to increase or decrease the optical power of the optical band-pass filter depending on the phase difference, a phase control signal is output, which is obtained by subtracting the resolution value of the n phase shifter from the previous phase control signal, until the optical power of the optical band-pass filter reaches a minimum, when the phase difference is $2n\pi$.

18. The phase optimization method as claimed in claim 15, wherein in outputting to the second arm a phase control signal that controls the phase difference to increase or decrease the optical power of the optical band-pass filter depending on the phase difference, a phase control signal is output, which is obtained by adding the resolution value of the $\pi$ phase shifter to the previous phase control signal, until the optical power of the optical band-pass filter reaches a minimum, when the phase difference is $(2n+1)\pi$.

19. A phase optimization method to obtain a maximum extinction ratio in a wavelength converter including a first arm having a first semiconductor optical amplifier that is operated with a first predetermined current and amplifies a pump signal and a probe signal, a second arm having a second semiconductor optical amplifier that is operated with a second predetermined current and amplifies the probe signal, and a $\pi$ phase shifter that controls the phase of the amplified signal, and an optical band-pass filter that filters optical signals output from the first and second arms, which have interfered and have been mixed with each other, to output only the probe signal that has been modulated in a same manner as the pump signal has been modulated, the phase optimization method comprising:
feeding back a portion of the output signal of the optical band-pass filter to detect a peak hold voltage signal and a bottom hold voltage signal; determining a phase difference between the first and second arms from a difference between the peak hold and bottom hold voltage signals; and
outputting to the second arm a phase control signal that controls the phase difference to increase or decrease the optical power of the optical band-pass filter depending on the phase difference;
wherein feeding back a portion of the output signal of the optical band-pass filter to detect a peak hold voltage signal and a bottom hold voltage signal comprises:
separating a portion of the output signal of the optical band-pass filter from the output signal; converting the separated signal into a current signal;
converting the current signal into a voltage signal; and detecting the peak hold voltage signal and bottom hold voltage signal from the voltage signal.

20. A phase optimization method to obtain a maximum extinction ratio in a wavelength converter including a first arm having a first semiconductor optical amplifier that is operated with a first predetermined current and amplifies a pump signal and a probe signal, a second arm having a second semiconductor optical amplifier that is operated with a second predetermined current and amplifies the probe signal, and a π phase shifter that controls the phase of the amplified signal, and an optical band-pass filter that filters optical signals output from the first and second arms, which have interfered and have been mixed with each other, to output only the probe signal that has been modulated in a same manner as the pump signal has been modulated, the phase optimization method comprising:
  feeding back a portion of the output signal of the optical band-pass filter to detect a peak hold voltage signal and a bottom hold voltage signal; determining a phase difference between the first and second arms from a difference between the peak hold and bottom hold voltage signals; and
  outputting to the second arm a phase control signal that controls the phase difference to increase or decrease the optical power of the optical band-pass filter depending on the phase difference;
  wherein the determining a phase difference between the first and second arms from a difference between the peak hold and bottom hold voltage signals comprises:
  subtracting a resolution value of the π phase shifter from the previous phase control signal or adding the resolution value to the previous phase control signal;
  determining that the phase difference is 2nπ when the difference between the peak hold and bottom hold voltage signals is decreased according to the subtraction result; and
  determining that the phase difference is (2n+1)π when the difference between the peak hold and bottom hold voltage signals is increased according to the addition result.

21. A phase optimization method to obtain a maximum extinction ratio in a wavelength converter including a first arm having a first semiconductor optical amplifier that is operated with a first predetermined current and amplifies a pump signal and a probe signal, a second arm having a second semiconductor optical amplifier that is operated with a second predetermined current and amplifies the probe signal, and a π phase shifter that controls the phase of the amplified signal, and an optical band-pass filter that filters optical signals output from the first and second arms, which have interfered and have been mixed with each other, to output only the probe signal that has been modulated in a same manner as the pump signal has been modulated, the phase optimization method comprising:
  feeding back a portion of the output signal of the optical band-pass filter to detect a peak hold voltage signal and a bottom hold voltage signal; determining a phase difference between the first and second arms from a difference between the peak hold and bottom hold voltage signals; and
  outputting to the second arm a phase control signal that controls the phase difference to increase or decrease the optical power of the optical band-pass filter depending on the phase difference;
  wherein in the outputting to the second arm a phase control signal that controls the phase difference to increase or decrease the optical power of the optical band-pass filter depending on the phase difference, a phase control signal is output, which is obtained by subtracting the resolution value of the π phase shifter from the previous phase control signal, until the optical power of the optical band-pass filter reaches a minimum, when the phase difference is 2nπ.

22. A phase optimization method to obtain a maximum extinction ratio in a wavelength converter including a first arm having a first semiconductor optical amplifier that is operated with a first predetermined current and amplifies a pump signal and a probe signal, a second arm having a second semiconductor optical amplifier that is operated with a second predetermined current and amplifies the probe signal, and a π phase shifter that controls the phase of the amplified signal, and an optical band-pass filter that filters optical signals output from the first and second arms, which have interfered and have been mixed with each other, to output only the probe signal that has been modulated in a same manner as the pump signal has been modulated, the phase optimization method comprising:
  feeding back a portion of the output signal of the optical band-pass filter to detect a peak hold voltage signal and a bottom hold voltage signal; determining a phase difference between the first and second arms from a difference between the peak hold and bottom hold voltage signals; and
  outputting to the second arm a phase control signal that controls the phase difference to increase or decrease the optical power of the optical band-pass filter depending on the phase difference;
  wherein in the outputting to the second arm a phase control signal that controls the phase difference to increase or decrease the optical power of the optical band-pass filter depending on the phase difference, a phase control signal is output, which is obtained by adding the resolution value of the π phase shifter to the previous phase control signal, until the optical power of the optical band-pass filter reaches a minimum, when the phase difference is (2n+1)π.

23. A phase optimization apparatus comprising: a serially connected group comprising:
  a first semiconductor optical amplifier connected in parallel with a second semiconductor optical amplifier that has a π phase shifter that is serially connected to the second semiconductor optical amplifier; an optical band-pass filter; and
  a phase control unit, wherein the phase control unit comprises, sequentially coupled, a splitter, a photodiode, an I/V amplifier, a low-pass filter, and a phase controller, and wherein the phase controller is further coupled to provide feedback to the phase controller to the π phase shifter.

24. A phase optimization apparatus, comprising:
  a first arm having a first semiconductor optical amplifier that is operated with a first predetermined current and amplifies a pump signal and a probe signal;
  a second arm having a second semiconductor optical amplifier that is operated with a second predetermined current and amplifies the probe signal, and a π phase shifter that controls the phase of the amplified probe signal;
  an optical band-pass filter that filters optical signals output from the first and second arms, which have interfered and have been mixed with each other, and outputs the probe signal that has been modulated in a same manner that the pump signal has been modulated; and
  a phase control unit that receives as feedback a portion of the output signal of the band-pass filter and outputs a phase control signal, which controls a phase difference between the first and second arms to increase or decrease an optical power of the band-pass filter depending on the phase difference, to the π phase shifter of the second arm, wherein the phase control unit comprises:

a splitter, to separate a portion of the output signal of the band-pass filter from the output signal to output a phase control signal to obtain a maximum extinction ratio to the π phase shifter, wherein the portion is the probe signal;

a photo-diode to convert the probe signal output from the splitter into a current signal;

an I/V amplifier to convert the current signal output from the photo-diode into a voltage signal;

a Peak Hold (PH) detector to detect a PH signal VPH from the voltage signal output from the I/V amplifier;

a Bottom Hold (BH) detector to detect a BH signal VBH from the voltage signal output from the I/V amplifier; and a phase controller to determine whether the phase difference between the first and second arms resides in a first region or a second region using the output signals VPH and VBH.

* * * * *